Patented Jan. 16, 1951

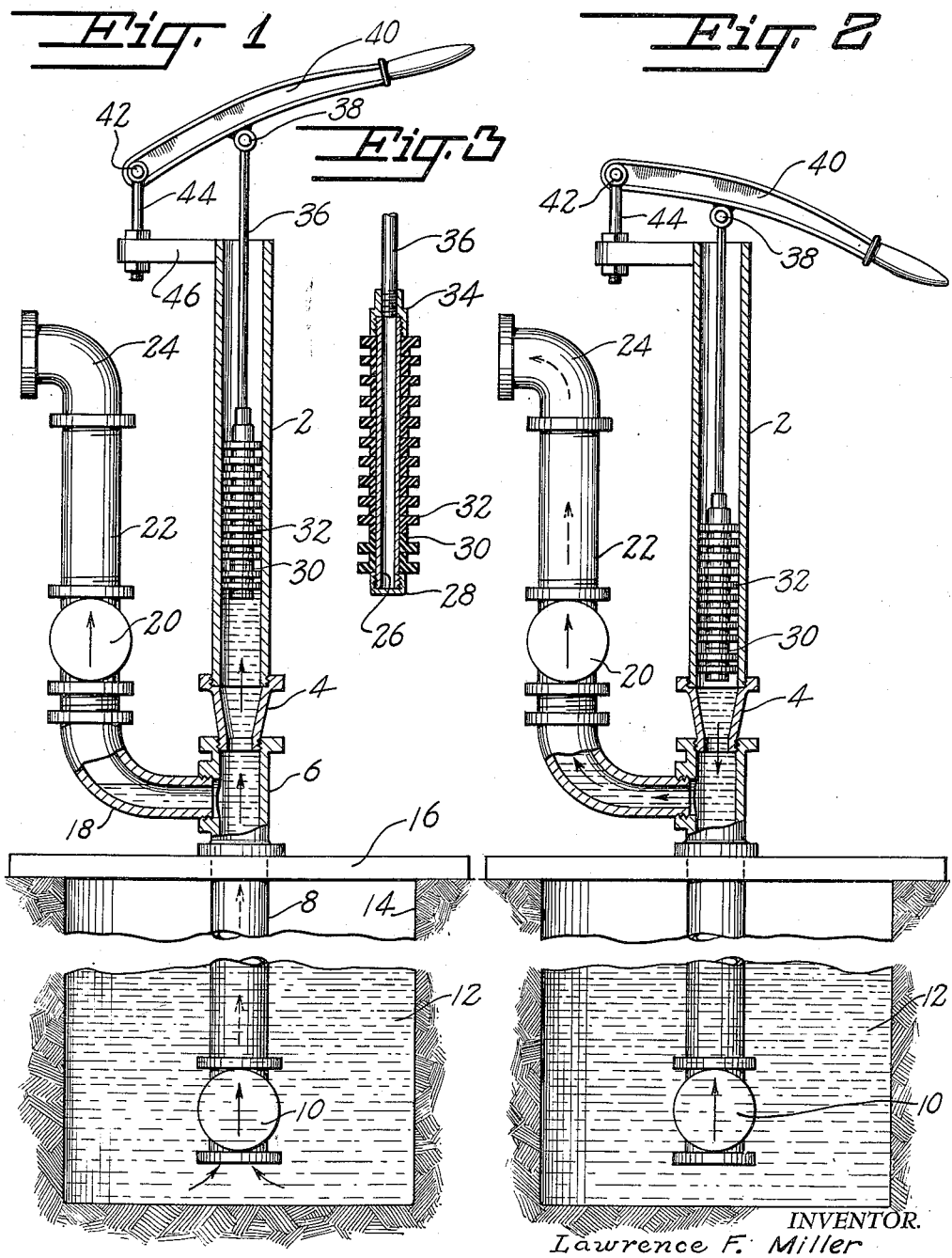

2,538,467

UNITED STATES PATENT OFFICE 2,538,467

PUMP PISTON

Lawrence Finise Miller, Clovis, N. Mex.

Application December 21, 1948, Serial No. 66,555

1 Claim. (Cl. 309—23)

My present invention relates to an improved pump of the reciprocating type especially adapted for use in dug wells and operable upon the up stroke to draw up a quantity of water and by means of check valves, to discharge the water on the down stroke.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is a vertical sectional view of the pump of my invention having drawn up a quantity of water and ready to discharge the same.

Fig. 2 is a similar view showing the piston position at the end of the discharge stroke.

Fig. 3 is an enlarged detail view in section of the piston.

Referring now to the drawings, I have shown a cylinder 2 having a restricted lower neck 4 for T-connection 6 from which depends pipe 8 and provided with a check valve 10 which allows water 12 in well 14 to move upward and closes to permit downward flow.

The T-connection is supported on floor 16 and has an elbow 18 and its check valve 20 from which pipe 22 and elbow 24 may provide any suitable discharge.

A sucker rod or piston comprises cylinder 26 on which is threaded the lower cap 28 to support the rubber gaskets or rings 30 formed with annular flanges 32 which fit snugly into the cylinder 2.

A collar 34 is threaded onto the upper end of cylinder 26 and receives the rod 36 pivotally connected at 38 to handle 40 journaled at 42 in yoke 44 secured on arm 46.

As the handle and sucker rod or piston are raised, the water is drawn up into cylinder 2 with valve 20 closed and valve 10 open and when the piston starts down, the check valve 10 closes and valve 20 opens so that the water in cylinder 2 is discharged at 24.

By the use of the novel piston herein, including the flanged rubber rings, the suction will be preserved and the operation under effective and efficient control.

Having thus fully described my invention what I claim as new and desire to secure by Letters Patent is:

In a pump piston for a pump having a manually operated piston rod the improvement comprising a cylinder having upper and lower externally threaded ends, a collar having an internally threaded bore for connecting to said rod connected to the upper end of said cylinder, a plurality of rubber gaskets mounted on said cylinder, each gasket having an annular flange coextensive with one edge thereof and a portion of the gasket being mounted on said cylinder so that the flanges are uppermost and the gasket engage the flange of the next lower gasket and the remaining portion of the gaskets are mounted on said cylinders so that the flanges are in inverted relation to the flanges on the first said gasket so that the lowermost gaskets of said first portions will engage the uppermost gasket of said remaining portions whereby said flanges will be in opposed relation to each other, and a cap connected to the lower end of the cylinder to retain said gaskets in position on said cylinder.

LAWRENCE FINISE MILLER.

REFERENCES CITED

The following references are of record in the file of this patent:

UNITED STATES PATENTS

| Number | Name | Date |
|---|---|---|
| 174,814 | Harper | Mar. 14, 1876 |
| 237,193 | Mallory | Feb. 1, 1881 |
| 349,951 | Patten et al. | Sept. 28, 1886 |
| 2,208,620 | Baisch | July 23, 1940 |
| 2,344,687 | Fischer et al. | Mar. 21, 1944 |
| 2,431,653 | Volpin | Nov. 25, 1947 |